(12) United States Patent
Grimm

(10) Patent No.: US 8,685,138 B2
(45) Date of Patent: Apr. 1, 2014

(54) TILTING ROTARY FURNACE SYSTEM AND METHODS OF ALUMINUM RECOVERY

(75) Inventor: Erik D. Grimm, Parkersburg, WV (US)

(73) Assignee: Altek L.L.C., Exton, PA (US)

(\*) Notice: Subject to any disclaimer, the term of this patent is extended or adjusted under 35 U.S.C. 154(b) by 0 days.

(21) Appl. No.: 13/610,551

(22) Filed: Sep. 11, 2012

(65) Prior Publication Data

US 2013/0000450 A1    Jan. 3, 2013

Related U.S. Application Data

(62) Division of application No. 12/851,114, filed on Aug. 5, 2010, now Pat. No. 8,262,983.

(51) Int. Cl.
| | |
|---|---|
| C22B 9/00 | (2006.01) |
| C22B 21/00 | (2006.01) |
| F27B 7/12 | (2006.01) |
| F27B 14/14 | (2006.01) |
| F27D 1/18 | (2006.01) |

(52) U.S. Cl.
USPC .............................................. 75/672; 75/687

(58) Field of Classification Search
USPC .................................................. 75/687, 672
See application file for complete search history.

(56) References Cited

U.S. PATENT DOCUMENTS

| | | |
|---|---|---|
| 1,708,403 A | 4/1929 | Tharaldsen |
| 3,814,406 A | 6/1974 | Shimizu et al. |
| 4,952,237 A | 8/1990 | Dube et al. |
| 5,145,361 A | 9/1992 | Kurzinski |
| 5,158,737 A | 10/1992 | Stein |
| 5,299,933 A | 4/1994 | Mosci |
| 5,460,518 A | 10/1995 | Mosci |
| 5,527,380 A | 6/1996 | Gripenberg et al. |
| 5,537,380 A | 7/1996 | Sprankle, Jr. et al. |
| 5,540,752 A | 7/1996 | Spoel |
| 5,616,023 A | 4/1997 | Mosci |
| 5,688,470 A | 11/1997 | Spoel |
| 5,749,722 A | 5/1998 | Driscoll et al. |
| 6,159,269 A | 12/2000 | Drouet et al. |
| 6,395,221 B1 | 5/2002 | Yerushalmi |

(Continued)

FOREIGN PATENT DOCUMENTS

| | | |
|---|---|---|
| DE | 580572 | 7/1933 |
| DE | 892382 | 10/1953 |

(Continued)

OTHER PUBLICATIONS

Database WPI, Section Ch, Week 198540, Derwnt Publications, Ltd., London, GB; AN 1985-248200, XP002181434, & SU 1146532A, Mar. 23, 1985, abstract.

(Continued)

*Primary Examiner* — George Wyszomierski
*Assistant Examiner* — Tima M McGuthry Banks
(74) *Attorney, Agent, or Firm* — Renner, Otto, Boisselle & Sklar, LLP

(57) ABSTRACT

A tilting rotary furnace with a door assembly that seals against a furnace vessel. The seal between the door and the furnace vessel allows for regulation of the internal environment of the furnace and control over thermitting of the aluminum. As a result, aluminum recovery may be carried out without the use of salt. A portion of the door may rotate with the furnace vessel and a portion of the door may remain rotationally stationary with respect to the furnace vessel and the rotating portion of the door.

14 Claims, 3 Drawing Sheets

(56) References Cited

U.S. PATENT DOCUMENTS

| | | |
|---|---|---|
| 2003/0134249 A1 | 7/2003 | Slade et al. |
| 2004/0012129 A1 | 1/2004 | Summer |
| 2006/0199125 A1 | 9/2006 | Evans |

FOREIGN PATENT DOCUMENTS

| | | |
|---|---|---|
| DE | 2063912 | 7/1971 |
| DE | 29814570 | 11/1998 |
| DE | 69504680 | 3/1999 |
| EP | 155368 | 9/1985 |
| EP | 0400925 | 12/1990 |
| EP | 756014 | 1/1997 |

OTHER PUBLICATIONS

International Search Report and Written Opinion from counterpart International Application No. PCT/US2011/046628, dated Nov. 16, 2011.

TILTING ROTARY FURNACE SYSTEM AND METHODS OF ALUMINUM RECOVERY

RELATED APPLICATION DATA

This application is a divisional of U.S. patent application Ser. No. 12/851,114, filed Aug. 5, 2010, now U.S. Pat. No. 8,262,983, the disclosure of which is herein incorporated by reference in its entirety.

TECHNICAL FIELD OF THE INVENTION

The technology of the present disclosure relates generally to rotary furnaces and, more particularly, to a tilting rotary furnace system used in the reclamation of non-ferrous metals from scrap or dross and a method of operating the furnace. The furnace system is configured to reclaim aluminum without the use of salt.

BACKGROUND

There is an ever present demand for recycling various materials, such as metals, from scrap and waste items. One recyclable material is aluminum. Recyclable aluminum may be obtained from a number of sources, such as waste aluminum from manufacturing facilities, industrial scrap, used automobile parts such as engine blocks, beverage containers, and the like.

But aluminum presents considerable challenges for recycling since the oxidation (e.g., thermitting) of aluminum is exothermic, which leads to a hotter reclamation process with temperature spikes and to less recovered aluminum. To control thermitting, aluminum recycling processes that melt aluminum have used salt (sometimes referred to as flux). The salts include, for example, potassium chloride (KCl), sodium chloride (NaCl) and/or other salt such as NaF, NaBr, KF and FBr. The use of salt has several drawbacks, including contributing to the amount of waste product (e.g., dross) from the recycling process and increasing the amount of resources used in the recycling process.

SUMMARY

To improve the recovery of aluminum, disclosed is a tilting rotary furnace with a door assembly that seals against a furnace vessel. The seal between the door and the furnace vessel allows for regulation of the internal environment of the furnace and control over thermitting of the aluminum. As a result, aluminum recovery may be carried out without the use of salt. A portion of the door may rotate with the furnace vessel and a portion of the door may remain rotationally stationary with respect to the furnace vessel and the rotating portion of the door.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Figure 1:
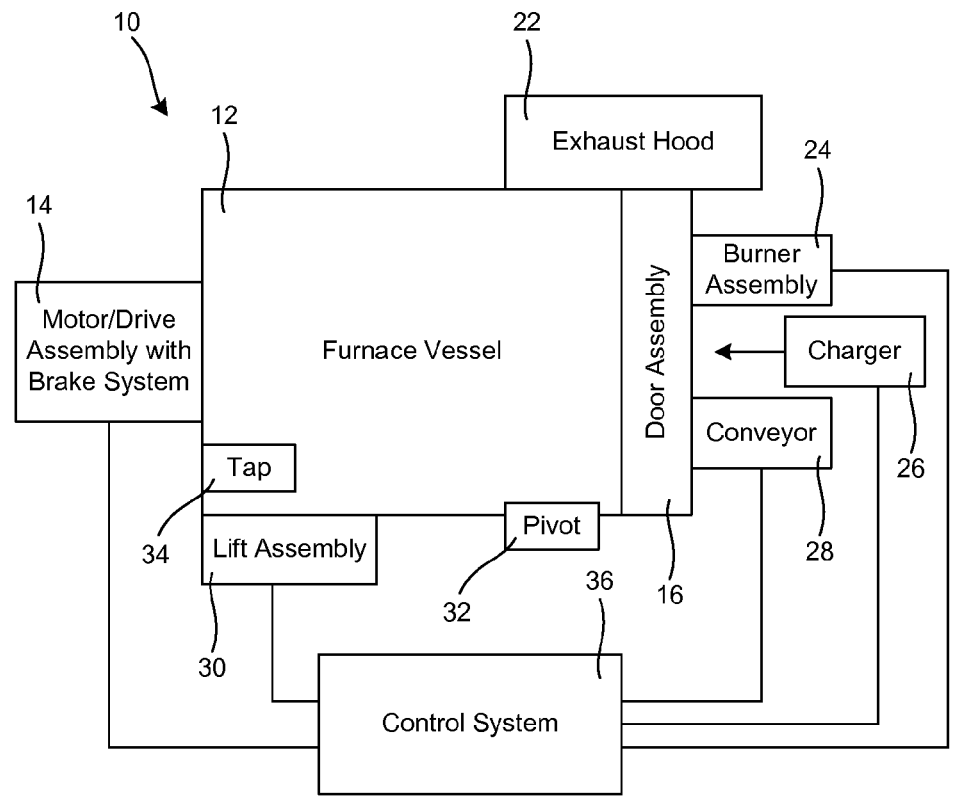
FIG. 1 is a schematic block view of a tilt-type rotary furnace system according to various aspects of the disclosure.
Figure 2:
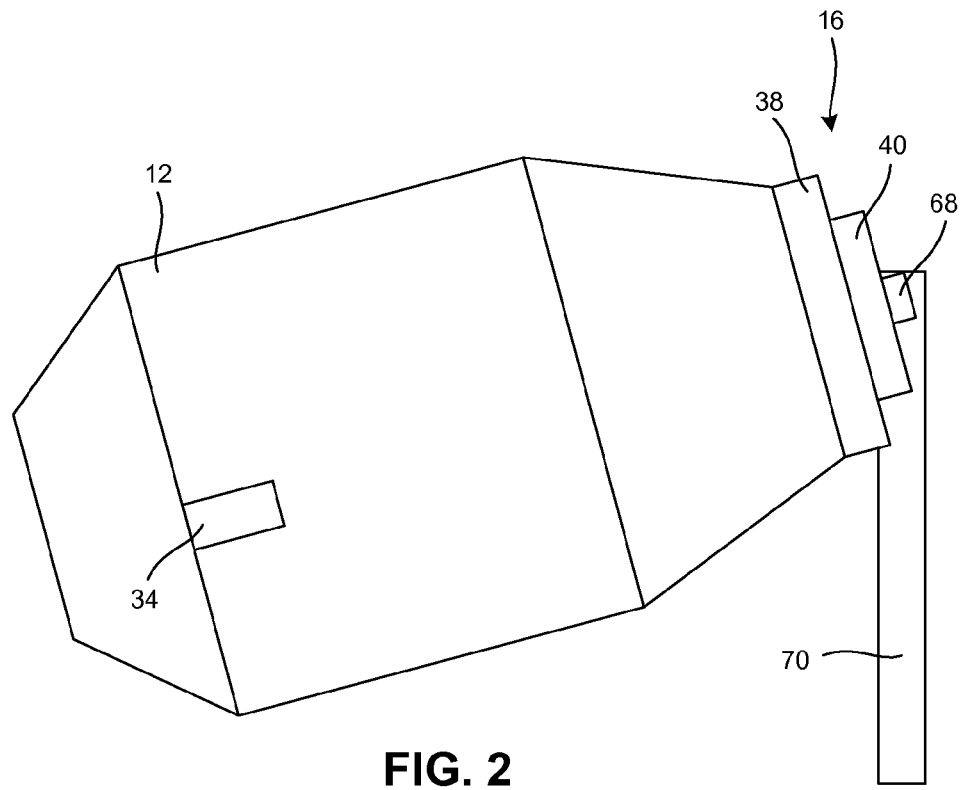
FIG. 2 is a side view of a furnace vessel for the furnace system with a door assembly in a closed position.
Figure 3:
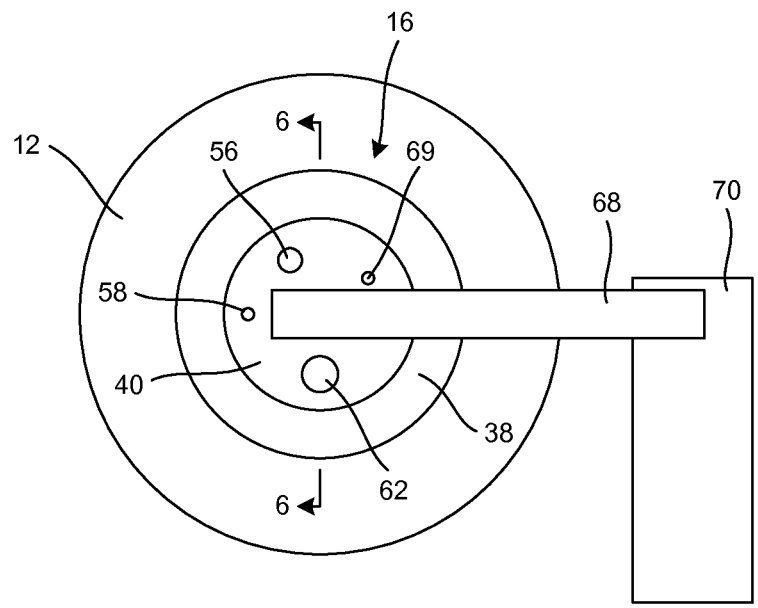
FIG. 3 is front view of the furnace vessel with the door assembly in a closed position.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Furnace System

With initial reference to FIG. 1, illustrated is a schematic block diagram of a tilt-type rotary furnace system 10 for processing non-ferrous metals. The furnace system has specific application for recovering aluminum from starting material, which is typically scrap material or dross material obtained from some other industrial process. In general, the starting material is charged into the furnace system 10 and melted to separate and recover the desired metal from other materials in the starting material. Exemplary procedures for recovering aluminum from different types of starting materials are described in greater detail below.

The starting material may be obtained from any number of sources, such as waste aluminum from manufacturing facilities, industrial scrap, used automobile parts such as engine blocks, beverage containers, and the like. The aluminum-containing starting material may be oily and/or painted. In addition, the starting material may contain impurities and may be mixed with pieces of material made from other types of metals, including ferrous metals. Dross containing aluminum is often obtained as a by-product from a manufacturing facility which uses molten metals or obtained from slag resulting from an earlier aluminum reclamation cycle.

Figure 4:
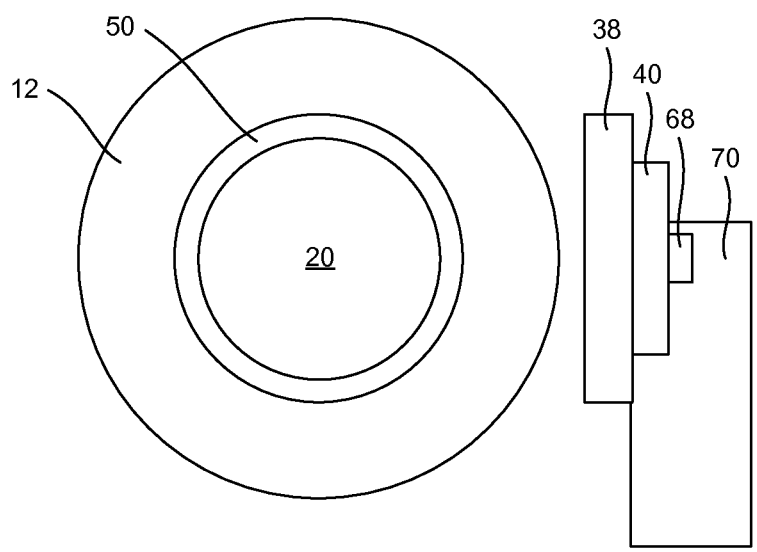
FIG. 4 is a front view of the furnace vessel with the door assembly in an open position.
Figure 5:
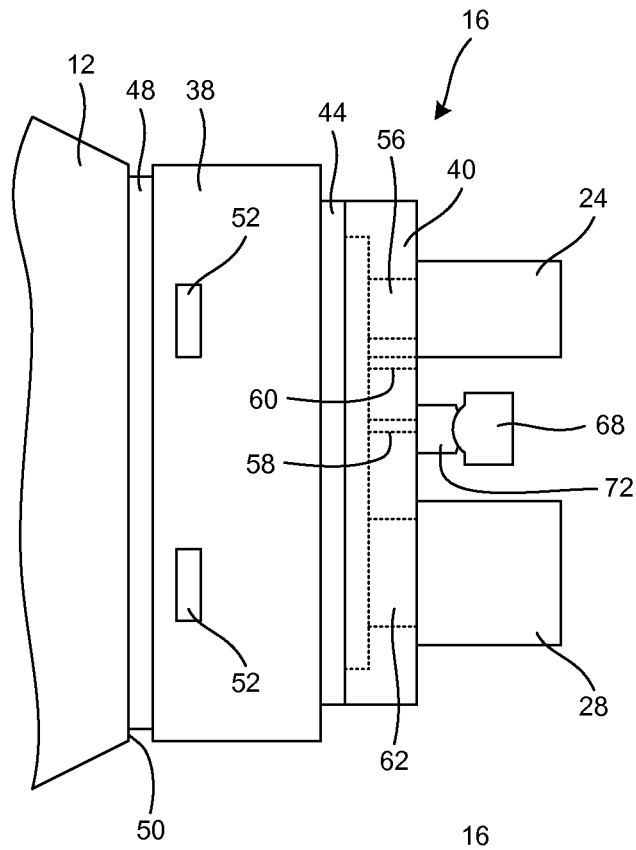
FIG. 5 is a side view of the door assembly.
Figure 6:
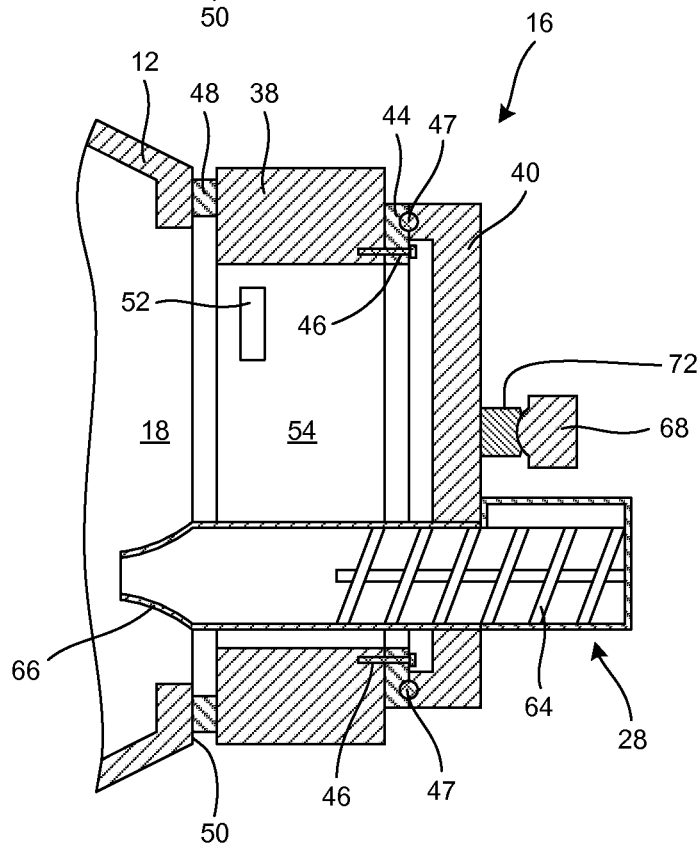
FIG. 6 is a cross-section of the door assembly taken along the line 6-6 in FIG. 3.

The furnace system 10 has a furnace vessel 12 that is rotated about a longitudinal axis by a motor and drive assembly 14. The motor and drive assembly 14 may include a braking system to assist in controlling and/or stopping rotation of the furnace vessel 12. The furnace system 10 has a door assembly 16 for selectively covering and sealing an inlet passage 18 (FIG. 6) at a front end of the furnace vessel 12. The inlet passage 18 leads to a refractory chamber 20 (FIG. 4) that is defined by internal walls of the furnace vessel 12. An exhaust hood 22 may be strategically positioned over at least part of the furnace system 10.

Heat may be supplied into the refractory chamber 20 with a burner assembly 24, which may be an oxy-fuel burner or an air gas burner. Inert gasses, such as argon, also may be introduced into the refractory chamber 20 via the burner assembly 24. In one embodiment, the door assembly 12 may be opened and the starting material may be charged into the refractory chamber 20 with a charger 26, such as a conveyor or other loading machine, as is known in the art. In other embodiments, material may be introduced into the refractory chamber 20 with a through-the-door conveyor 28, as will be described in greater detail below.

The height of a rear end of the furnace vessel 12 may be controlled by a lift assembly 30 that includes, for example, cylinders or screw jacks. Some materials, such as residue that remains after recovering molten aluminum may be discharged, or unloaded, from the refractory chamber 20 in a pouring or decanting-type action, such as by tilting the rear end upwards about a pivot 32. Molten aluminum may be discharged through a tap 34 or through the mouth of the furnace vessel 12 by upward tilting of the rear of the furnace vessel 12.

The furnace system 10 may include a control system 36 for controlling operation of the various controllable components of the furnace system 10 and for implementing portions of the below-described processes of recovering aluminum. The control system 36 may be implemented using computer technology and, therefore, may execute logical instructions with a processor of the control system 36. The logical instructions may be embodied as one or more programs (also referred to as code or software) that are stored on a non-transitory computer readable medium (e.g., a magnetic memory, an optical memory and/or an electronic memory) of the control system 36. Control functions may include, but are not limited to, controlling the motor and drive assembly 14 for effectuating rotation of the furnace vessel 12, monitoring the torque to rotate the rotating furnace vessel, monitoring and controlling the atmosphere (including oxygen level) in the refractory chamber 20, monitoring the temperature in the refractory chamber 20 to assess the temperature of the material (including molten aluminum temperature) in the furnace vessel 12, controlling the lift assembly 30, controlling the position (open or closed) of the door assembly 16, controlling the firing of the burner assembly 24, controlling the introduction of gasses into the refractory chamber 20, controlling the introduction of solids (e.g., the starting material and/or quench) into the refractory chamber 20, and so forth.

With additional reference to FIGS. 2-6, the door assembly 16 will be described in detail. The door assembly 16 includes a rotating portion 38 and a non-rotating portion 40. When viewed from the viewpoint of FIG. 3, the furnace vessel 12 and the rotating portion 38 may be rotated in the counter-clockwise direction during melting of the aluminum-containing charge material. When the door assembly 16 is closed, and the furnace vessel 12 is rotated, the rotating potion 38 will rotate with the furnace vessel 12 and the non-rotating portion will not have rotational movement in a circumferential direction. In this manner, the furnace vessel 12 and the rotating portion 38 will rotate with respect to the non-rotating portion 40, which is circumferentially stationary with respect to the furnace vessel 12 and the rotating portion 38.

An annular bearing assembly 42 may be located between the rotating portion 38 and the non-rotating portion 40 to effectuating the relative movement of the rotating portion 38 and the non-rotating portion 40. In the illustrated embodiment, the bearing assembly 42 includes a stationary portion that is connected to or integral with the non-rotating portion 40 and a rotating portion that rotates with the rotating portion 38. For example, as shown in the illustrated embodiment, the rotating portion of the bearing assembly 42 may be a mounting ring 44 that is secured to the rotating portion 38. For instance, the mounting ring 44 may be bolted to the rotating portion 38 with bolts 46. As is further illustrated, the stationary portion of the bearing assembly 42 may be integral with the non-rotating portion 40. Ball bearings 47, cylindrical bearings, or other bearing members or surfaces may be trapped between the stationary portion of the bearing assembly 42 (e.g., the non-rotating portion 40 of the door assembly 16 in the illustrated embodiment) and the rotating portion of the bearing assembly 42 (e.g., the mounting ring 44 in the illustrated embodiment) to effectuate relative movement of the components. In another embodiment, the rotating portion of the bearing assembly 42 may be integral with the rotating portion 38 and/or the stationary portion of the bearing assembly 42 may be a second mounting ring that is secured (e.g., with bolts) to the non-rotating portion 40.

An annular sealing member 48 may be present between the rotating portion 38 and an opposing lip surface 50 of the furnace vessel 12. The sealing member 48 may, to the greatest extent possible, minimize or eliminate the flow of gasses from the environment into the refractory chamber 20. The sealing member 48 may be a ceramic fiber rope or a ceramic fiber mat that is cut to the appropriate shape. The lip surface 50 may include an annular recess or groove for receiving the sealing member 48.

The rotating portion 38 may be annular and may be made from steel with a refractory inner lining, or made entirely from refractory material. Vents 52 or other through passages may be present in the rotating portion 38. The vents 52 may extend radially through the rotating portion 38. The vents allow hot gasses and other effluents to escape from the refractory chamber 20. These effluents may be directed by the exhaust hood to a capture and/or treatment assembly (e.g., a baghouse). At pertinent times of the operation of the furnace system 10, the refractory chamber 20 may be kept under positive pressure so that there is an outflow through the vents 52 and air from the environment is not introduced through the vents 52. Additionally, and as will be described, the furnace may be purged with argon to control thermitting and/or to control furnace pressure.

The non-rotating portion 40 may include a panel (e.g., a plate-like member) that, together with the bearing assembly 42 covers a longitudinal passage 54 of the rotating portion 38. The non-rotating portion 40 may be made from steel with a refractory lining, or made entirely from refractory material. Longitudinal passages may be present in the non-rotating portion 40. For example, a burner passage 56 may be located in an upper, left hand quadrant of the non-rotating portion to allow the burner assembly 24 to access the refractory chamber 20. Another passage may be a temperature monitoring passage 58 to allow a temperature reader (e.g., an infrared thermometer) to access the refractory chamber 20. Another passage may be a gas monitoring passage 60 to allow a gas monitor (e.g., an oxygen sensor) to access the refractory chamber 20 and/or passage 54. Another passage may be a conveyor passage 62 to allow the conveyor 28 to access the refractory chamber 20.

The conveyor 28 may be a screw conveyor that allows materials to be introduced into the refractory chamber 20 through the door assembly 16 and during various operational stages of the furnace system 10. The conveyor 28 may be of stainless steel construction. The conveyor 28 may include a motor driven screw 64 to feed materials through a chute 66 and into the refractory chamber 20. The chute 66 may have a taper or constriction leading up to a discharge end thereof. A hopper, a pneumatic conveyor, a cyclone assembly, or a feeder mechanism may be present to deliver materials to the screw 64 for advancement of the materials by the screw 64 through the chute 66. The conveyor 28 may include a cover, a rotary air lock, and/or an argon purge to minimize air from the environment from flowing into the refractory chamber 20 through the conveyor.

The conveyor 28 may be used to introduce aluminum-containing material from which aluminum is to be recovered into the refractory chamber 20. In this case, the aluminum is sized for handing by the conveyor 28 and may be in the form of fines or chips.

The conveyor 28 also may be used to introduce a thermite dampening material (or quench) into the refractory chamber 20. For instance, after tapping of molten aluminum, aluminum oxide (also known as alumina) of a predetermined mesh size may be introduced through the conveyor 28. The quench may absorb heat and cool the remaining slag to minimize oxidation of reactive portions of the slag when the door assembly 16 is opened and the slag is exposed to oxygen in the air from the environment. The aluminum oxide or other quenching material may have a consistency and particle size to enable screw feeding using the conveyor 28. The consistency and particle size may be selected to provide a relatively high amount of surface area to effectuate cooling of the slag. Therefore, the aluminum oxide may be in the form of a powder, or in the form of chips or particles, although configurations are possible. The quench may be mixed with the remaining slag by furnace rotation. Alternatively, the door assembly 16 may be opened and the quench may be mixed with the remaining slag using an auxiliary stirring tool.

Also, the quench may be placed in the conveyor 28 to block airflow through the conveyor 28 and into the refractory chamber 20 during melting and tapping of aluminum. The amount of material that is fed into the conveyor for this purpose may be selected to at least partially fill the chute 66 under movement of the screw 64, but not to introduce substantial amounts of material into the refractory chamber 20. To assist in packing of the material to block the passage, the screw 64 may be briefly run in reverse.

Tapping of molten aluminum from the refractory chamber 20 may be accomplished by opening the tap 34. Opening the tap 34 may include, for example, removing a plug. The tap 34 may be opened when the tap 34 is circumferentially located above the level of molten aluminum in the refractory chamber 20. Then the furnace vessel 12 may be slowly rotated and braked so that the tap 34 becomes located below the level of the aluminum and the aluminum flows from the tap 34 and into a collection device (e.g., a sow pan or pouring trough). The tap 34 may be positioned so that the tap 34 is located at or near the lowest point on the furnace vessel 12 when the furnace vessel 12 is titled for tapping and the furnace vessel 12 is rotated so that the tap 34 is facing downward toward the ground below the furnace vessel 12.

The door assembly 16 may be supported by an arm 68 that is mounted to a pedestal 70. The arm 68 may swing the door assembly 16 between the open and closed positions. Also, the arm may apply force to the door assembly 16 so that sufficient sealing and frictional force is present between the seal 48 and the lip surface 50 is present. The frictional force between the seal 48 and the lip surface 50 should be greater than the frictional forces in the bearing assembly 42 so that the rotating portion 38 rotates with the furnace vessel 12 and the non-rotating portion 40 remains circumferentially stationary. The burner 24, the conveyor 28 and any other appropriate devices (e.g., oxygen sensor and/or temperature sensor) may be attached to the non-rotating portion 40 so that these devices also remain circumferentially stationary.

The non-rotating portion 40 may be secured to the arm 68 with a linkage assembly 72. The linkage assembly 72 and/or arm may allow for tilting and longitudinal movement of the door assembly 16 while maintaining the integrity of the contact between the seal 48 and the lip surface 50. Titling and longitudinal movement of the door assembly 16 may result from vibration and shifting of the furnace vessel 12 during rotation and agitation of refractory chamber 20 contents and from thermal expansion and contraction. In one embodiment, the linkage 72 and arm 68 may include a knuckle arrangement so that a concave surface of one of these members receives a cooperating convex surface of the other one of these members. Springs, shock absorbers, control rods or other appropriate members may be included in the connection of the arm 68 to the door assembly 16.

The bearing assembly 42 may be manufactured to withstand the temperature and stress extremes of the operating environment of the furnace assembly 10. Nevertheless, it is possible that the bearing assembly 42 could freeze. For this possibility, the bolts 46 may be made to shear, thereby allowing rotation of the mounting ring 44 against the rotating portion 38. So that the rotating portion 38 does not shift out of position after shearing of the bolts 46, the mounting ring 44 and the rotating portion may engage each other with radial interference (e.g., using a tongue and groove arrangement). In another embodiment, the strength of the linkage 72 and arm 68 may be greater than the friction forces between the seal 48 and the lip surface 50. In this embodiment, the rotating portion 38 will stop rotating and become circumferential stationary with the non-rotating portion 40. Also, in the event of freezing of the bearing assembly 42, the furnace assembly 10 may be controlled to minimize thermitting of aluminum until the furnace assembly 10 reaches a state where repairs to the door assembly 16 may be made. In one embodiment, accelerometers or other monitoring sensors may be mounted on the non-rotating portion 40. If rotation of the non-rotating portion 40 is sensed, the motor (if moving) may be stopped, the burner assembly 24 (if lit) may be extinguished, and the refractory chamber 20 may be flooded with argon. Additionally, an alarm may be used to alert nearby people to the sensed condition.

Aluminum Recovery

First Exemplary Procedure

A first exemplary method of recovering aluminum with the furnace assembly 10 will now be described. This method may be considered "salt-free" since the method does not include introducing salt into the refractory chamber to retard thermitting of aluminum, at least prior to tapping of recoverable molten aluminum. A primary reason that this method may avoid the use of salt is the configuration of the door assembly 16, including the sealing properties of the door assembly 16 and the ability of the door assembly 16 to remain in the closed position through the melting and recovery of aluminum. These properties contribute to minimal thermitting of the aluminum contained in the process materials that are loaded into the furnace system 10 for the melting of aluminum.

The method may commence with a "clean" refractory chamber 20. Cleaning the refractory chamber 20, if warranted, may include manually scraping the inside walls of the furnace vessel 12 to remove materials that build up through the use of the furnace system 10 to recover aluminum. Heat may be introduced into the refractory chamber 20 to thermally soften built-up oxides and aluminum to assist in the scraping of the inside walls.

Next, with the door assembly 16 in the open position, process materials may be loaded into the refractory chamber 20 using, for example, a charge car or mobile equipment with a charge bucket. For this exemplary process flow, the process materials may be dross or scrap material.

Then, the burner assembly 24 may be lit. With the burner assembly 24 lit, the door assembly 16 may be moved to the closed position to cover the inlet passage 18. Then, the burner assembly 24 may be fired in accordance with a burner setting appropriate for the process material to start the melting process. Oxygen level within the refractory chamber 20 may be continually monitored during the melting process and a slightly positive atmosphere may be maintained in the refractory chamber 20 during the melting process. In addition to firing the burner assembly 24, the furnace vessel 12 may be rotated at an appropriate speed. If the charge includes relatively large and heavy pieces of process material, the rotational direction of the furnace vessel 12 may be periodically reversed (also referred to as "jogged back and forth") to agitate the charge, especially before the process materials are softened by heat.

The progress of the melting cycle may be monitored by monitoring the amount of torque used to rotate the furnace vessel 12. The amount of torque may be indicated by current draw of the motor in the motor and drive assembly 14, for example. Exemplary techniques for monitoring melt cycle progress in this manner are disclosed in U.S. Pat. No. 6,395,221 issued May 28, 2002, the disclosure of which is herein incorporated by reference in its entirety. In one embodiment, the torque (or an indicator or torque, such as current draw) may be plotted on a monitor for observation by the operator. Additional information may be used to monitor and/or assess the melting process, such as burner settings, process gas and oxygen set points, amounts of consumed gas and oxygen, flu temperature, baghouse temperature, molten metal temperature ascertained with a temperature sensor (e.g., infrared thermometer) that reads the refractory wall temperature, running total of process heat output from the burner assembly 24 (e.g., measured in BTUs) per unit weight (e.g., per pound) of process material. This information may be compared with look-up tables to generate as assessment of melt condition of the process material.

In general, during melting of the process material, the furnace system 10 will be operated with a "slow roll" of the furnace vessel 12 and at a burner setting selected by the operator and/or the control system 36. A downward trend in torque to rotate the furnace vessel 12 is indicative of melting of the process materials. As the process materials become molten, the rotational speed of the furnace vessel 12 is typically increased to increase mixing of the process materials and oxide to achieve a homogeneous chemistry and a homogeneous temperature gradient throughout the molten bath and process materials.

At this point, the control system and/or the operator may determine the cycle length and tapping time as a function of the torque to rotate the furnace vessel 12 and the molten metal temperature. When the metal reaches a temperature of approximately 30 degrees Fahrenheit below a desired tap temperature, the burner assembly 24 may be shut off and the refractory chamber 20 may be flooded with a predetermined amount of argon to extinguish thermitting materials in the refractory chamber 20. This also allows the molten aluminum to absorb heat from any super-heated materials and from the refractory material of the furnace vessel 12, thereby decreasing the temperature of the super-heated materials, which will extinguish and/or prevent thermitting.

Then, the furnace vessel 12 may be rotated at a relatively high rate of speed (including up to the maximum rotational speed allowed by the furnace system 10, which may be about 10 rpm to about 13 rpm). In one embodiment, rotation at this speed may last about ten minutes. If the metal temperature is sufficient to tap after the high speed rotation, the tap 34 may be opened and the molten metal may be drained from the refractory chamber 20 as described above.

After tapping, the tap 34 may be closed. Then, the furnace vessel 12 may be rotated at high speed again (e.g., for about ten minutes) and/or the burner assembly 24 may be fired. After the second high speed rotation and/or burner assembly 24 firing, the furnace vessel 12 may be retapped to remove additional molten aluminum.

Following tapping, the door assembly 16 may be moved to the open position to remove slag (primarily aluminum oxide) from the furnace. Prior to opening the door assembly, the temperature of the slag may be determined using the infrared temperature sensor and quench (e.g., "cold" aluminum oxide) may be added to the refractory chamber 20 through the conveyor 28 to cool the slag. The furnace vessel 12 may be rotated to mix the quench and hot slag.

Aluminum Recovery

Second Exemplary Procedure

A second exemplary method of recovering aluminum with the furnace assembly 10 will now be described. The second exemplary method may be employed to recover aluminum from aluminum or aluminum-containing "chips" that are of a size to be passed through the conveyor 28. Similar to the first method, this method may be considered "salt-free" since the method does not include introducing salt into the refractory chamber to retard thermitting of aluminum, at least prior to tapping of recoverable molten aluminum. A primary reason that this method may avoid the use of salt is the configuration of the door assembly 16.

The second exemplary method may include two processing cycles before removing slag from the refractory chamber 20. As will be described, a first charge of process material may receive approximately fifty percent by weight of quench based on an estimated after-tap slag weight. A second charge of process material may receive an amount of quench effective to maintain a controllable slag (e.g., slag that does not undergo excess thermitting) for slag removal. In one embodiment, heating of both charges of process material may not exceed approximately eighty percent of the capacity of the furnace system 10. Skim generated during the two cycles may be collected and put into the process charge for a first cycle of a future iteration of the second exemplary method. In one embodiment, of the second exemplary method, an average melt rate may be about 125 pounds per minute to about 175 pounds per minute. A tap temperature goal for the molten metal in the second exemplary method may be about 1300 degrees F. to about 1320 degrees F., depending on the alloy being melted and desired aluminum output characteristics. The temperature of the molten metal may be as determined using a temperature sensor (e.g., the above-described infrared temperature sensor that indirectly determines molten metal temperature by reading the temperature of the lining of the furnace vessel 12).

The first process cycle may start with a clean furnace vessel 10. Then, the burner assembly 24 may be lit and the door assembly 16 may be closed. Also, the furnace vessel 12 may be turned at a relatively slow speed while the burner assembly 24 is set to an idle setting, which is typically a lowest controllable setting of the burner assembly 24.

Using the screw feeding capability of the conveyor 28, a first charge of chips may be introduced into the refractory chamber 20. In one embodiment, the conveyor 28 may include a rotation counter that may be used to count the number of rotations used to introduce chips into the furnace vessel 12. The volume of chips that are introduced into the furnace vessel 12 per rotation of the conveyor 28 may depend on the size of the chips. The weight of the chips that are introduced into the furnace vessel 12 per rotation of the conveyor 28 may depend on the volume and density of the chips. Using measurements of chip size and/or density, the volume and/or weight of the chips that are introduced into the furnace vessel 12 may be closely estimated by counting the rotations of the conveyor 28. In one embodiment, the first charge of chips may be about fifty percent of the available volume of the refractory chamber 20.

Once the furnace system 10 is charged with chips as the process material, the heat output from the burner assembly 24 may be increased to a predetermined BTU setting for the charge of chips. As the chips begin to become molten, the torque to rotate the furnace vessel 12 will start to drop and stabilize. At this point, the burner assembly 28 may be fired for several more minutes and then reduced to the idle setting. At that point, additional chips may be charged into the furnace vessel 12 using the conveyor 28 until a desired total weight or volume of chips has been introduced into the furnace vessel 12. The burner assembly 24 then may be fired at a predetermined BTU setting.

Through this point in the first process cycle, the rotational speed of the furnace vessel 12 may be kept within to a relatively slow speed limit measured in revolutions per minute (RPM). As the charge continues to become molten, the torque to rotate the furnace vessel 12 will start to drop and stabilize. At this point, the rotational speed of the furnace vessel may be increased to a relatively high rate of speed (including up to the maximum rotational speed allowed by the furnace system 10). The high speed rotation may be carried out for about ten minutes.

Monitoring of furnace system 10 conditions may be carried out, including monitoring flu gas temperature, torque to rotate the furnace vessel 12 (e.g., as indicated by current draw of the drive motor), and molten metal temperature (e.g., as indicated by the temperature of the refractor lining of the furnace vessel 12). When the metal reaches a temperature of about 10 degrees F. below a desired tap temperature, the burner assembly 24 may be shut off and the refractory chamber 20 may be flooded with a predetermined amount of argon to quickly extinguish thermitting materials in the refractory chamber 20. This also allows the molten aluminum to absorb heat from any super-heated materials and from the refractory material of the furnace vessel 12, thereby decreasing the temperature of the super-heated materials.

Then, after the burner is shut off, the furnace vessel 12 may be rotated at a relatively high rate of speed (including up to the maximum rotational speed allowed by the furnace system 10). In one embodiment, rotation at this speed may last about ten minutes. If the metal temperature is sufficient to tap after the high speed rotation, the tap 34 may be opened and the molten metal may be drained from the refractory chamber 20 as described above.

If it is evident that there is not enough latent temperature inside the furnace vessel 12 to maintain a suitable tap temperature, the burner assembly 12 may be relit until monitoring of furnace system 10 conditions indicates that the metal temperature is sufficient for tapping. If the metal temperature is sufficient to tap, the tap 34 may be opened and the molten metal maybe drained from the furnace vessel 12 as described above. Following a first tapping of the first process cycle, reheating, high speed rolling, and/or retapping may be carried out in similar manner to that described for the first exemplary method.

Following tapping, the weight of the remaining slag in the furnace vessel 12 may be approximated. Approximating this weight may be based on the weight of the tapped aluminum during the first process cycle and the weight of all material charged into the furnace vessel 12 during the first process cycle. A predetermined amount of quench for the approximate weight of the slag then may be introduced into the furnace vessel 12 using the conveyor 28 to cool the slag. The furnace vessel 12 may be rotated to mix the quench and hot slag. In an alternative embodiment, the door assembly may be opened and the quench may be introduced using the charger 26 or other means (e.g., mobile equipment with a bucket loader).

At this point, the burner assembly 24 may be relit and set to the idle setting, the door assembly 16 may be closed (if opened) and the second exemplary method may advance into the second process cycle.

The second process cycle may include rotating the furnace vessel 12 at slow speed and charging the refractory chamber 20 with chips using the conveyor 28. In one embodiment, chips are charged into the furnace vessel 12 until about fifty percent of the volume of the refractory chamber 20 is filled. Volume and/or weight may be approximated using the rotational counter of the conveyor 28 as described above.

Once the furnace system 10 is charged with chips as the process material, the heat output from the burner assembly 24 may be increased to a predetermined BTU setting for the charge of chips.

As the chips begin to become molten, the torque to rotate the furnace vessel 12 will start to drop and stabilize. At this point, the burner assembly 28 may be fired for several more minutes and then reduced to the idle setting. At that point, additional chips may be charged into the furnace vessel 12 using the conveyor 28 until a desired total weight or volume of chips has been introduced into the furnace vessel 12. The burner assembly 24 then may be fired at a predetermined BTU setting.

Through this point in the second process cycle, the rotational speed of the furnace vessel 12 may be kept to within a relatively slow speed limit. As the charge continues to become molten, the torque to rotate the furnace vessel 12 will start to drop and stabilize. At this point, the rotational speed of the furnace vessel may be increased to a relatively high rate of speed (including up to the maximum rotational speed allowed by the furnace system 10). The high speed rotation may be carried out for about ten minutes.

Monitoring of furnace system 10 conditions may be carried out, including monitoring flu gas temperature, torque to rotate the furnace vessel 12 (e.g., as indicated by current draw of the drive motor), and molten metal temperature (e.g., as indicated by the temperature of the refractor lining of the furnace vessel 12). When the metal reaches a temperature of about 10 degrees F. below a desired tap temperature, the burner assembly 24 may be shut off and the refractory chamber 20 may be flooded with a predetermined amount of argon to quickly extinguish thermitting materials in the refractory chamber 20. This also allows the molten aluminum to absorb heat from any super-heated materials and from the refractory material of the furnace vessel 12, thereby decreasing the temperature of the super-heated materials.

Then, after the burner is shut off, the furnace vessel 12 may be rotated at a relatively high rate of speed (including up to the maximum rotational speed allowed by the furnace system 10). In one embodiment, rotation at this speed may last about ten minutes. If the metal temperature is sufficient to tap after the high speed rotation, the tap 34 may be opened and the molten metal may be drained from the refractory chamber 20 as described above.

If it is evident that there is not enough latent temperature inside the furnace vessel 12 to maintain a suitable tap temperature, the burner assembly 12 may be relit until monitoring of furnace system 10 conditions indicates that the metal temperature is sufficient for tapping. If the metal temperature is sufficient to tap, the tap 34 may be opened and the molten metal maybe drained from the furnace vessel 12 as described above. Following a first tapping of the second process cycle, reheating, high speed rolling, and/or retapping may be carried out in similar manner to that described for the first exemplary method.

Following tapping, the weight of the remaining slag in the furnace vessel 12 may be approximated. Approximating this weight may be based on the weight of the tapped aluminum for the first and second process cycles and the weight of all material charged into the furnace vessel 12 during the first and second process cycles. A predetermined amount of quench for the approximate weight of the slag then may be introduced into the furnace vessel 12 using the conveyor 28 to cool the slag. The furnace vessel 12 may be rotated to mix the quench and hot slag. In an alternative embodiment, the door assembly may be opened and the quench may be introduced using the charger 26 or other means (e.g., mobile equipment with a bucket loader).

Then, the slag may be removed by opening the door assembly 16 (if not already open), tilting the rear of the furnace vessel 12 upward with the lift assembly 30 and rotating the furnace vessel 12. The slag may be collected in cooling pans. The slag may be compressed with a dross press. Also, the slag may be allowed to cool by standing in the pans or may be cooled using a cooling apparatus, such as a water or air cooled rotary dross cooler.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of reclaiming aluminum from a charge of aluminum-containing material, comprising
    rotating a furnace vessel containing the charge of aluminum-containing material, the rotation of the furnace vessel causing rotation of a rotating portion of a door assembly; and
    firing a burner through a passage of a non-rotating portion of the door assembly, the rotating portion sealed against the furnace vessel so that the rotating part and the non-rotating portion of the door assembly combine to cover an inlet passage of the furnace vessel to control an atmospheric environment inside the furnace vessel, and heat from the burner melting the aluminum in the charge of aluminum-containing material without introduction of a charge of salt for retarding thermitting of the aluminum; and
    wherein matter is introduced into the furnace vessel through the non-rotating portion of the door assembly using a conveyor; and
    wherein the conveyor holds inert material in the conveyor during melting of the aluminum in the furnace vessel to limit air entry into the furnace vessel through the conveyor.

2. The method of claim 1, further comprising tapping molten aluminum through a tap in a sidewall of the furnace vessel.

3. The method of claim 1, wherein the charge of aluminum-containing material is the matter introduced into the furnace vessel through the non-rotating portion of the door assembly using the conveyor.

4. The method of claim 1, wherein quench for slag that remains in the furnace vessel following reclamation of aluminum is the matter introduced through the non-rotating portion of the door assembly using the conveyor.

5. The method of claim 1, wherein the conveyor is part of the door assembly and moves with the door assembly between closed and open positions of the door assembly.

6. The method of claim 1, wherein the door assembly is supported by a support structure that comprises a moveable member that moves the door assembly between an open position and a closed position, the non-rotating portion of the door assembly non-rotationally coupled to the moveable member.

7. A method of reclaiming aluminum from a charge of aluminum-containing material, comprising:
    closing a door assembly against a furnace vessel and over an inlet passage of the furnace vessel, the door assembly comprising an annular rotating portion and a non-rotating portion, the rotating portion and the non-rotating portion combine to cover the inlet passage of the furnace vessel to control an atmospheric environment inside the furnace vessel;
    charging matter into the furnace vessel with a conveyor and through each of the closed non-rotating portion of the door assembly, the closed rotating portion of the door assembly, and the inlet passage;
    rotating the furnace vessel while the furnace contains the charge of aluminum-containing material, the rotation of the furnace vessel causing rotation of the rotating portion of the door assembly; and
    melting aluminum from the charge of aluminum-containing material by firing a burner through a passage of the non-rotating portion of the door assembly, the melting carried without introduction of a charge of salt for retarding thermitting of the aluminum; and
    recovering the molten aluminum from the furnace vessel via a tap in the furnace vessel.

8. The method of claim 7, wherein the door remains in the closed position through the melting and recovering of the aluminum.

9. The method of claim 7, wherein the matter charged into the furnace vessel is the charge of aluminum-containing material.

10. The method of claim 9, wherein the matter charged into the furnace vessel further comprises quench for slag that remains in the furnace vessel following the recovering of aluminum.

11. The method of claim 7, wherein the matter charged into the furnace vessel is quench for slag that remains in the furnace vessel following the recovering of aluminum.

12. The method of claim 7, wherein at least some of the charge of aluminum-containing material is introduced into the furnace vessel before closing the door.

13. The method of claim 7, wherein the conveyor is part of the door assembly and moves with the door assembly between closed and open positions of the door assembly.

14. The method of claim 7, wherein the door assembly is supported by a support structure that comprises a moveable member that moves the door assembly between an open position and a closed position, the non-rotating portion of the door assembly non-rotationally coupled to the moveable member.

* * * * *